United States Patent
Saad et al.

(10) Patent No.: US 11,238,157 B2
(45) Date of Patent: Feb. 1, 2022

(54) EFFICIENT DETECTION OF RANSOMWARE ATTACKS WITHIN A BACKUP STORAGE ENVIRONMENT

(71) Applicant: EMC IP Holding Company LLC, Hopkinton, MA (US)

(72) Inventors: Yossef Saad, Ganei Tivka (IL); Itay Glick, Ramat Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 78 days.

(21) Appl. No.: 16/876,274

(22) Filed: May 18, 2020

(65) Prior Publication Data
US 2021/0357504 A1 Nov. 18, 2021

(51) Int. Cl.
*G06F 21/56* (2013.01)

(52) U.S. Cl.
CPC .......... *G06F 21/565* (2013.01); *G06F 21/561* (2013.01); *G06F 21/567* (2013.01); *G06F 2221/034* (2013.01)

(58) Field of Classification Search
CPC .... G06F 21/565; G06F 21/561; G06F 21/567; G06F 2221/034
See application file for complete search history.

(56) References Cited

U.S. PATENT DOCUMENTS

| 8,745,003 B1* | 6/2014 | Patterson | G06F 16/128 707/639 |
| 2013/0198137 A1* | 8/2013 | Miller | G06F 11/1451 707/646 |

* cited by examiner

*Primary Examiner* — Brian F Shaw
(74) *Attorney, Agent, or Firm* — Dergosits & Noah LLP; Todd A. Noah

(57) ABSTRACT

Described is a system that efficiently detects ransomware attacks within a storage environment. The system may perform a specialized validation by comparing a sampling of backup data obtained from a storage environment with a sampling of data maintained by a specialized validation database. Accordingly, if there is a discrepancy between the samples, the system may issue an alert indicating the original backup data may be encrypted as part of a ransomware attack. The system may utilize the specialized sampling as a validation technique in addition, or as an alternative, to relying on data fingerprints for validation. For example, malicious code may be configured to cause the storage environment to provide fingerprints prior to an unauthorized encryption as an attempt to deceive certain validation processes. Accordingly, to counteract such attempts, the system may rely on the sampling of data, instead of relying solely on a fingerprint comparison.

20 Claims, 6 Drawing Sheets

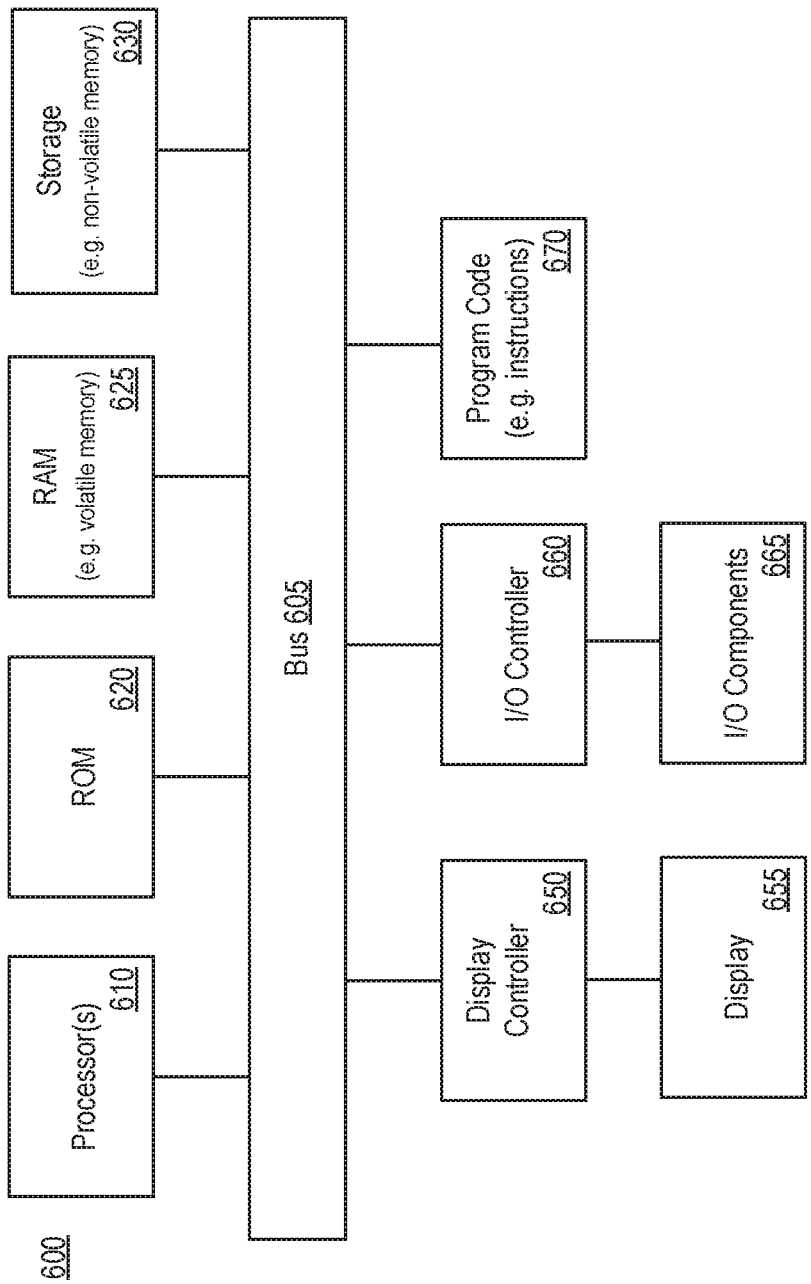

EFFICIENT DETECTION OF RANSOMWARE ATTACKS WITHIN A BACKUP STORAGE ENVIRONMENT

TECHNICAL FIELD

This disclosure relates to identifying a cyber security threat, and more particularly, identifying a ransomware attack that maliciously encrypts data of a storage system.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. As with all computing systems, data storage systems must be concerned with various types of cyber security threats that may potentially harm data stored within a storage environment. For example, such threats may include ransomware-type attacks whereby a malicious party (e.g. a hacker, disgruntled user/employee, etc.) encrypts files of a user thereby rendering them unusable without the decryption key. Accordingly, the malicious party may then demand a ransom from the user to provide a key and/or decrypt the files. These malicious parties often target large enterprise computing environments in the hopes of extracting a large payout. Enterprise computing environments often have recovery procedures that may provide a certain degree of protection against ransomware attacks such as the ability to recover and restore encrypted files from a backup storage. However, due to the increasing sophistication of these malicious parties, such backup storage environments may be the initial point of attack before targeting a production storage environment. For example, knowing that a production environment may detect an unauthorized encryption of files promptly (e.g. in response to applications not being able to access the encrypted files), a malicious party may first target backup files within a backup storage environment for encryption. In addition, the malicious party may compromise the backup environment in a manner that delays (if not prevents) detection of the malicious encryption of backup files. Accordingly, once the backup storage environment is compromised, the malicious party need only be moderately successful in infiltrating the production storage environment to potentially extract a ransom from the enterprise, which is without access to certain recovery procedures. Thus, there is a continued need to prevent ransom-ware type attacks, and more particularly, attacks that may target backup infrastructure.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 6 is a block diagram illustrating an example computing system that may be used in conjunction with one or more embodiments of the disclosure.

DETAILED DESCRIPTION

Figure 1:
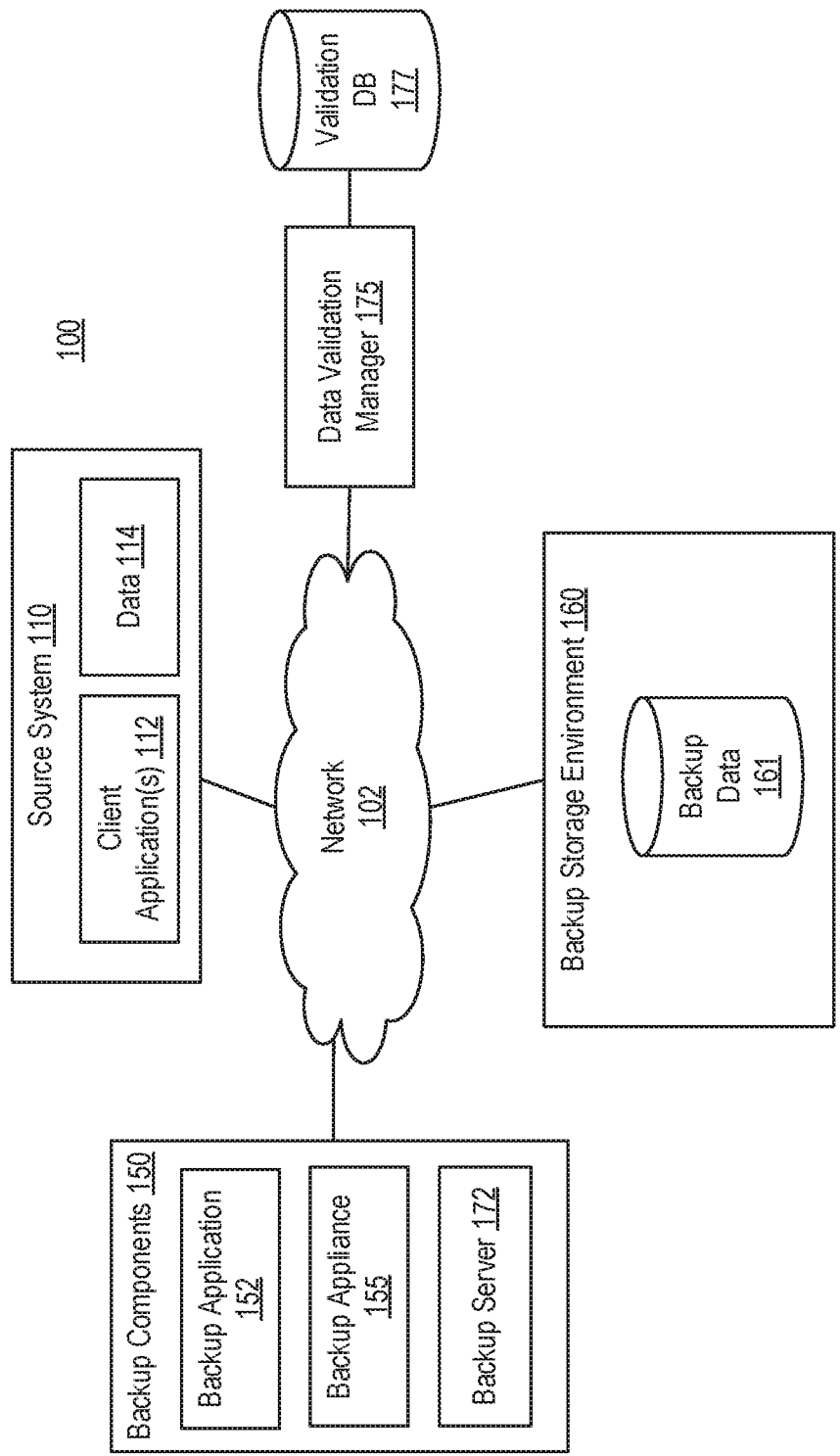
FIG. 1 is a block diagram illustrating an example operating environment for detecting ransomware attacks within a backup storage environment according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for efficient detection of ransomware attacks within a backup storage environment. More particularly, the system may perform a specialized validation of the contents of backup data to determine whether backup data has been subjected to an unauthorized alteration by a ransomware (or ransomware-type) attack. For example, the system may compare a sampling of backup file data obtained from a backup storage environment with a sampling maintained by a specialized validation database. Accordingly, if there is a discrepancy between the samples, the system may issue an alert indicating the original backup data may be altered in an authorized manner such as being encrypted as part of a ransomware attack. The system may utilize the specialized sampling technique as an efficient validation technique in addition (or as an alternative) to relying on fingerprints of the backup file for validation. For example, malicious code used as part of a ransomware attack may be configured to cause the backup storage environment to provide the fingerprint of the backup file prior to an unauthorized encryption of the backup file as an attempt to deceive (or trick, spoof, fake, etc.) certain validation processes. Accordingly, to counteract such an attempt, the system may validate files by relying on the sampling of data, instead of relying solely on the fingerprints.

To provide such a capability, the system, in response identifying the creation of a new backup file, may request an initial sampling of bytes from the backup file that is stored within a backup storage environment. For example, the system may provide a set of random locations specific to the new backup file from which to obtain the sample bytes. The system may then store the initial sampling of bytes in a secure validation database. As part of a security policy, the system may periodically request a subsequent sampling of bytes from the backup file. The system may then alert the backup storage environment that the backup file has been subjected to an unauthorized alteration (e.g. unauthorized encryption) in response to determining the subsequent sampling of bytes received from backup storage environment does not match the initial sampling of bytes stored in the validation database. For example, the alert may be issued even instances where a current fingerprint maintained by backup storage environment for the backup file remains unchanged after the unauthorized alteration.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and recovery (or backup) services. For example, at least some functionality may be provided by, or implemented in connection with, various platforms such as the Data Domain™ data protection platform provided by Dell EMC™ Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique (e.g. file-based, block-based, object-based storage, etc.), infrastructure (e.g. cloud-based), or hardware (e.g. Solid State Drive (SSD), Hard Disk Drive (HDD), etc.).

More specifically, and with reference to FIG. 1, shown is a block diagram illustrating an example of an operating environment 100 for detecting ransomware attacks within a backup storage environment according to one or more embodiments of the disclosure.

As shown, the environment 100 may include a source system 110, backup components 150, a data validation manager 175, validation database 177, and a backup storage environment 160. The components of operating environment 100 may interact via a network 102, which may be any type of wired or wireless network including a local area network (LAN), a storage area network (SAN), a wide area network (WAN), or a direct communication link, or other suitable connection.

The source system 110 may be associated with a client (or customer) of a data protection platform, and may act as a client from which data to be protected (e.g. backed-up) originates. In some embodiments, the source system (or client system) 110 may be in the form of a VM or a container. The source system 110 may host one or more client applications 112, and may include local storage 114, as well as an interface for communicating with other systems and devices, such as environment 160. Accordingly, the source system 110 may be an example of a host device. The local storage 114 can be used to locally store data, which may, along with the source system 110 itself, be backed up to the backup storage environment 150 as backup data 161.

The backup components 150 may include a backup application 152 that performs (or manages, coordinates, etc.) the creation and restoration of data that may be backed-up. For example, data to be backed-up from the source system 110 may be communicated from the source system 110 to the backup application 152 for initial processing, after which the processed data is uploaded from the backup application 152 for storage within environment 160 (e.g. as data 161). In some embodiments, the backup application 152 may cooperate with a backup client application of the source system 110 to back up client data. Backup application 152 may also cooperate with a backup client application to restore backup data from the backup storage environment 160 to the source system 110. In some embodiments, the backup application 152 may be a part of, or work in conjunction with, a backup appliance 155. For example, the backup (or storage) appliance 155 may include a Dell EMC CloudBoost appliance, although any suitable appliance is contemplated. In addition, the backup components 150 may include one or more of a backup server 172 that may be implemented in conjunction with a Data Domain deduplication storage server provided by Dell EMC for use with Data Domain™ Restorer (DDR) storage devices. In some embodiments, the backup server 172 may be a Dell EMC Avamar server or a Dell EMC Networker server, although no particular server is required, and other backup and storage system configurations are contemplated. It should be noted that the backup components 150 (e.g. backup application 152, backup appliance 155, or backup server 172) can be implemented in various forms, such as a virtual, physical, or native public cloud appliance to fit the requirements of a particular configuration, and the backup application 152 can be used with various types of data protection environments, including public and private object storage clouds.

The backup storage environment (or system) 160 may store backup data 161. The backup storage environment 160 may also store metadata for the backup data (or data) 161 and include one or more instances of a filesystem that catalogs files and other data residing in the backup storage environment 160. In general, the storage of backup data 161 may be configured to store source system 110 data backups that can be restored in the event of a loss of data (e.g. from a cyber security attack). The term backup is intended to be construed broadly and includes, but is not limited to, partial backups, incremental backups, full backups, clones, snapshots, any other type of copies of data, and any combination of the foregoing. Any of the foregoing may, or may not, be deduplicated. In some embodiments, the backup storage environment 160 may be provided as part of a cloud-based system (or service). In some embodiments, the backup storage environment 160 may include a secondary storage system (not shown). For example, the secondary storage system (or environment) may be configured to provide replication (or recovery, mirroring, etc.) capabilities for a primary storage system (environment). For example, the backup storage environment 160 may include a first data protection environment that includes a first instance of backup data (or primary backup data) 161, and the secondary storage system may include a second data protection environment that includes a second instance of the backup data (e.g. recovery data, or recovery backup data).

The data validation manager (or security tool, ransomware detection component, etc.) 175 may interact with the components of the backup storage environment 160 to verify the integrity of backup files that store the backup data 161. For example, the data validation manager (validation manager) 175 may verify the contents of one or more backup files have not been modified (e.g. encrypted) in an unauthorized or malicious manner. To perform such a validation, the validation manager 175 may store a sampling of contents (e.g. random bytes) of a backup file obtained at the time of writing, or creation of, the backup file. The validation manager 175 may store each sampling in a validation database 177. The validation database (or data store, data structure, data file, etc.) 177 may be a secure database that may be separate (e.g. external) to the backup storage environment 160. For example, even if the backup storage environment 160 becomes compromised by ransomware (e.g. malicious code), the validation database 177 may remain secure and not accessible by the ransomware. Accordingly, as further described herein, the validation manager 175 may perform a comparison between values of a current sampling of data provided from the backup storage environment 160, with values stored by the validation manager 175, and if there is a discrepancy between the values, the integrity of the data (e.g. backup data 161) may be compromised and a security alert may be issued. Accordingly, to provide such functionality, the validation manager 175 may coordinate (or manage, orchestrate, execute, automate, etc.) various operations (or processes, methods, etc.) to perform file validation. For example, the validation manager 175 may direct (or control, initiate, etc.), or work in conjunction with, other components of the operating environment 100 to perform various operations as further described herein. For example, the validation manager 175 may interact with an operating system (OS) or a file system of the backup storage environment 160, and/or components associated with the backup storage environment 160 such as the backup application 152. In addition, the validation manager 175 may provide an interface (e.g. application programming interface (API), graphical user interface (GUI), command line interface (CLI), etc.) that allows a user to configure various settings associated with validating aspects of the backup storage environment 160.

Accordingly, one or more components of the operating environment 100 (e.g. validation manager 175) may perform an efficient validation process for identifying various types of cyber threats. An example of such a process is further described with reference to FIGS. 2-4.

Figure 2:
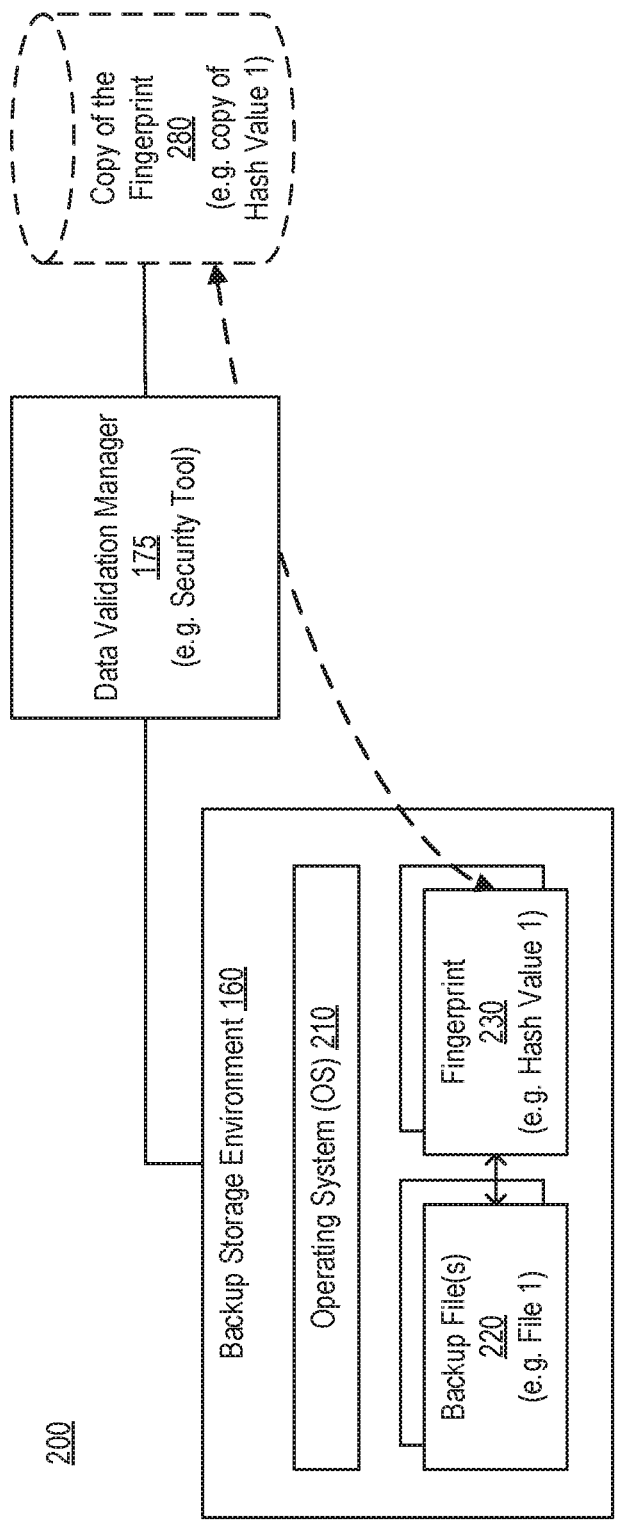
FIG. 2 is a block diagram illustrating an example interaction between components prior to a ransomware attack according to one or more embodiments of the disclosure.
Figure 3:
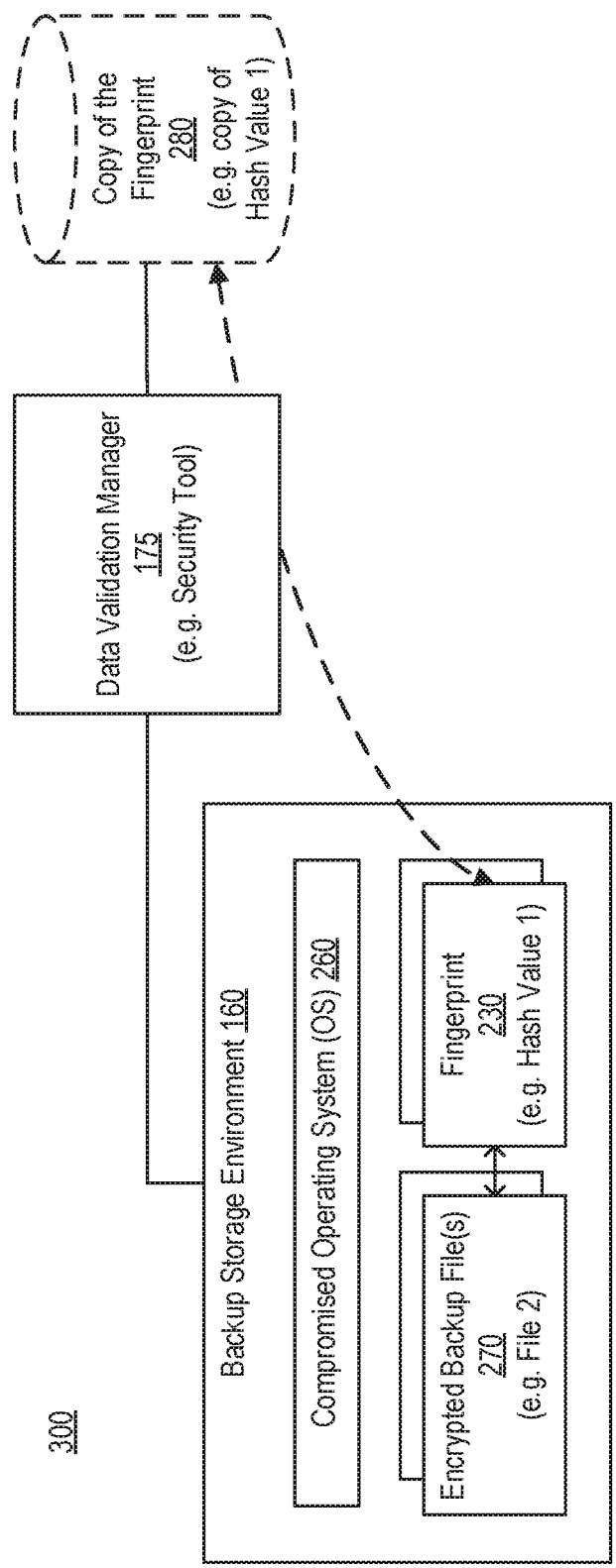
FIG. 3 is a block diagram illustrating an example interaction between components after a ransomware attack according to one or more embodiments of the disclosure.
Figure 4:
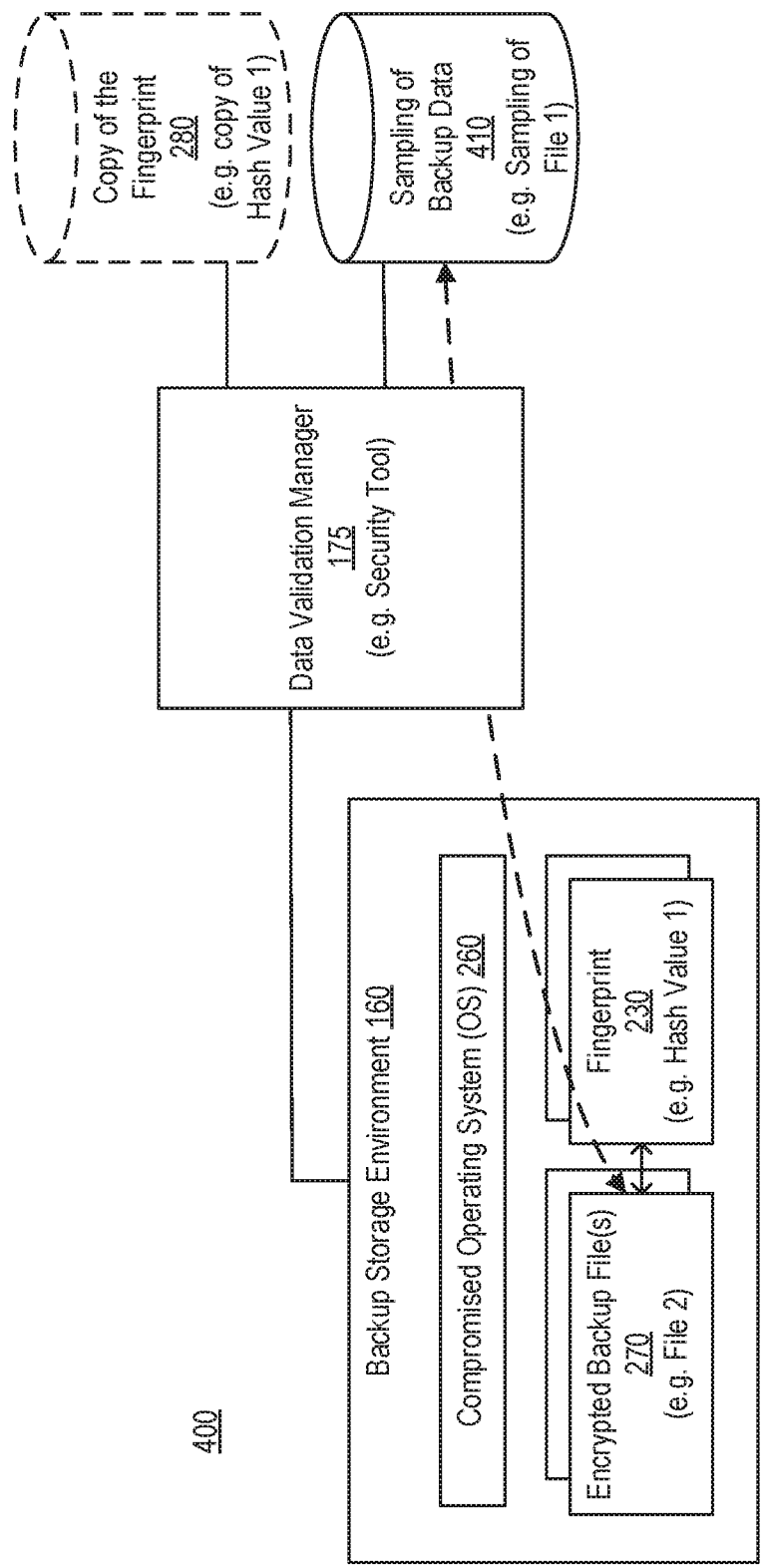
FIG. 4 is a block diagram illustrating an example interaction between components to detect a ransomware attack according to one or more embodiments of the disclosure.

FIGS. 2-4 illustrate an example of the interactions between components of the backup storage environment 160 when compromised by a ransomware attack.

For example, FIG. 2 shows a diagram 200 of an example of the interaction between the backup storage environment 160 and the validation manager (e.g. security tool) 175 prior to a ransomware attack. As referred to herein, a ransomware (or ransomware-type) attack may be any type of unauthorized alteration or action that renders a user's files (or data) inaccessible (unusable, locked, etc.). For example, a ransomware attack may be performed by malicious code (e.g. executed within the backup storage environment 160) that encrypt a user's files (e.g. using any suitable encryption technique) rendering the contents of the file inaccessible to the user without the decryption key. Accordingly, access to the decryption key requires satisfying the demands (e.g. payment) of the malicious party.

As shown, the backup storage environment 160 may include an operating system (OS) 210 that manages (e.g. a file system) backup file(s) 220, which may store backup data (e.g. backup data 161). As shown in this example, File 1 may represent the original backup file (e.g. backup file 220) created as part of a backup procedure. As part of the backup infrastructure, each backup file 220 may be associated with a fingerprint 230 such as a hash value. As shown in this example, File 1 may be associated with Hash Value 1 as the fingerprint. In some embodiments, the fingerprint 230 may be used to verify the integrity of the backup file 220. For instance, if the contents of the backup file 220 are modified (or changed, altered, updated, etc.) the associated (or corresponding) fingerprint 230 (e.g. hash value) would also be modified. Accordingly, verifying the integrity of the backup file 220 using the fingerprint 230 may be one way of validating the contents of backup file 220. In some embodiments, the validation manager 175 may store a copy of the fingerprint (or fingerprint copy) 280 in a database (e.g. validation database 177). For example, the copy of the fingerprint 280 (e.g. copy of Hash Value 1) may represent a copy of the original hash value (e.g. Hash Value 1) generated for the backup file 220 (e.g. File 1). Accordingly, the validation manager 175 may be capable of periodically verifying that the fingerprint 230 stored within the backup storage environment 160 matches the copy of the fingerprint 280 stored by the validation manager 175. However, ransomware may presume a verification process is capable of validating backup data in such a manner, and accordingly, may attempt to deceive such a verification process as further described with reference to FIG. 3.

For example, FIG. 3 shows a diagram 300 of an example of the backup storage environment 160 after being compromised (e.g. infected) by malicious code (e.g. a virus), for example, as part of a ransomware attack. As shown, the malicious code (or party) may encrypt the original backup file(s) (e.g. File 1) to create encrypted backup file(s) 270 (e.g. File 2). Once encrypted, the contents of the original backup files are not accessible unless decrypted, for example, using a decryption key. In addition, as shown, the malicious code may compromise (e.g. at least partially hack) the operating system resulting in a compromised operating system 260 that attempts to circumvent detection of the encryption, for example, by the validation manager 175. For example, as shown, the malicious code may retain the fingerprint 230 (e.g. original fingerprint) created prior to encryption. In some embodiments, retaining the fingerprint 230 may include preventing the backup storage environment 160 from updating the fingerprint 230 (e.g. Hash Value 1) to reflect the encryption. In other embodiments, retaining the fingerprint 230 may include the hacker's malware code overwriting the original fingerprint 230 (e.g. Hash Value 1) over the new value that is the hash of File 2, after it was updated by the OS 260. As a result, if requested, the compromised operating system 260 may provide the original fingerprint 230 (e.g. Hash Value 1) in response to a request to provide a fingerprint for the current backup file (e.g. File 2). In other words, the malicious code may attempt to deceive the validation manager 175 when performing a periodic validity check. For example, the attack may be premised on the validation manager 175 relying solely on the provided fingerprint to perform validation because recalculating hash values is resource intensive for large data sets often found in backup environments. However, as described, the validation manager 175, in some embodiments of the disclosure, may implement an additional and/or alternative validation technique to detect the backup storage environment 160 being compromised in manner as described in FIG. 3. For example, the validation manager 175 may use a data sampling validation technique as further described with reference to FIG. 4.

For example, FIG. 4 shows a diagram 400 of an example of the validation manager 175 using a sampling of backup data 410 to detect a ransomware attack. The sampling of backup data 410 may include one or more bytes of a backup file (e.g. backup file 220) that is stored by the validation manager 175. For example, one or more samplings of backup data 410 may be stored as part of a database (e.g. validation database 177). In some embodiments, each sampling (or sampling instance) 410 may be associated with (or correspond to) a particular backup file (e.g. File 1). In some embodiments, each sampling 410 may include N samples of L bytes, which may be selected at random from the corresponding backup file. In some embodiments, each sample may be relatively small in size (e.g. 2-10 bytes each) since it is unlikely the bytes would remain unchanged after encryption. For example, the sampling of backup data 410 may include 10 random, 5 byte samples, from the backup file. In some embodiments, the sampling 410 may be stored (or created, provided, etc.) upon the creation of the original backup file (e.g. File 1). For example, when a backup application (e.g. backup application 152) writes backup file 220, the backup application may inform the validation manager 175 that a new file is being created (or a current file is being updated) and the validation manager 175 may request the specific bytes for the sampling 410. Alternatively, the validation manager 175 may monitor the backup storage environment 160 and obtain the specific bytes for the sampling 410 from one or more components (e.g. OS, backup application 152, etc.) associated with the backup storage environment 160, in response to identifying the creation of a new backup file.

As part of the validation process, the validation manager 175 may request sampled (e.g. specific) bytes from the current version of a particular backup file. For example, the validation manager 175 may perform a validation for File 1 (e.g. backup file 220) by requesting the sampled bytes from the current version of File 1, which is now File 2 (e.g. encrypted backup file 270). In some embodiments, the validation manager 175 may request the sampled bytes directly from the backup storage environment, or indirectly via a backup application (e.g. backup application 152). In either scenario, the validating manager 175 may interact with an OS of the backup storage environment 160. As shown, after a ransomware attack, environment 160 may include a comprised OS 260. However, even the compromised OS 260 is not able to deceive the validation manager 175 because the compromised OS 260 does not know the correct values for the sampled bytes for File 1. Accordingly, the compromised OS 260 may provide the sampled bytes from File 2, which would not match the sampling of backup data 410 for File 1 (e.g. Sampling of File 1) stored (e.g. maintained) by the validation manager 175. In other words, the validation manager 175 may request the sampled bytes for File 1, and instead, the compromised OS 260 would return the sampled bytes for File 2. Moreover, even if the compromised OS 260 is aware of the use of the validation sampling technique, the compromised OS 260 (or malicious code) would still not be aware of which bytes the validation manager 175 may request, which may be randomized for each backup file (e.g. specific to File 1). For example, if the compromised OS 260 refuses to provide the sampled bytes (e.g. knowing the incorrect bytes would be provided), the validation manager 175 may be alerted of a potentially malicious event. Accordingly, upon failing to provide the correct bytes, the validation manager 175 may detect a malicious event (e.g. the unauthorized encryption of the original backup file 220).

In addition, even if the OS is not compromised, a non-compromised OS (e.g. OS 210) would return the sampled bytes from the contents of the current version of the backup file (e.g. encrypted backup file 270), which would alert the validation manager 175 that the backup files are compromised. For example, the non-compromised OS would return the sampled bytes from File 2, instead of File 1.

In some embodiments, the validation manager 175 may obtain the sampled bytes from a backup application (e.g. backup application 152). In other words, the validation manager 175 may potentially circumvent a potentially compromised OS 260. In such embodiments, the backup application would return the sampled bytes from the contents of the current version of the backup file (e.g. encrypted backup file 270), which would alert the validation manager 175 that the backup files are compromised.

Accordingly, the validation manager 175 may provide a validation technique that provides an additional layer of security against certain ransomware attacks. Moreover, the validation technique is efficient. For example, instead of attempting the recalculate hash values for backup files, which would take a considerable amount of time and resources, the system may instead, efficiently (e.g. with minimal overhead) and expediently compare samplings of data. Moreover, because the sampling may be performed relatively quickly, the validation manager 175 may detect an encryption before the attack by the malicious code can expand beyond the backup storage environment to a production environment (e.g. source system 110). For example, the validation manager 175 may issue an alert during the time it takes for the malicious code to finishing encrypting a certain number of backup files.

Figure 5:
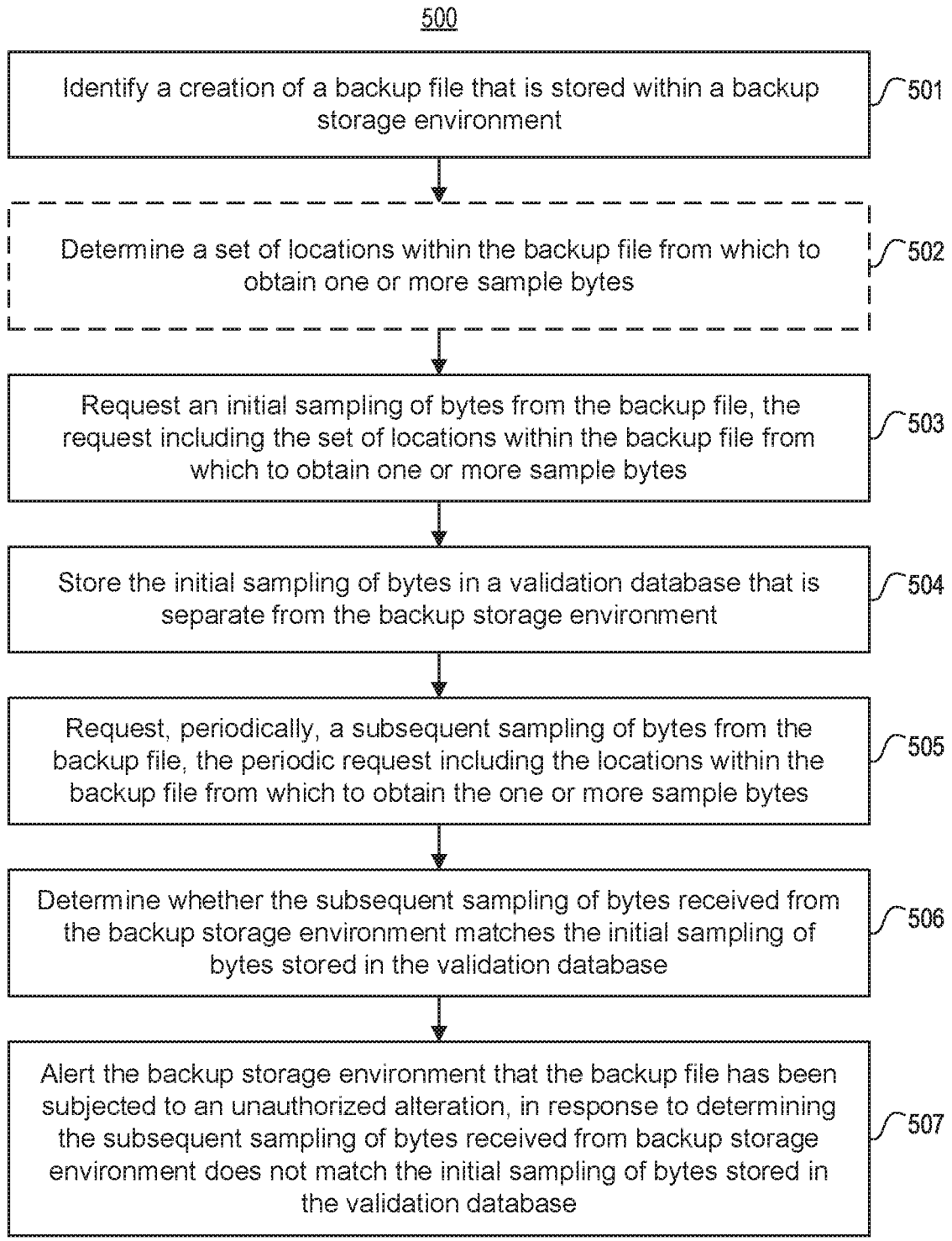
FIG. 5 is a flow diagram illustrating an example method of identifying an unauthorized alteration of a backup file using data sampling according to one or more embodiments of the disclosure.

FIG. 5 is a flow diagram illustrating an example method of identifying an unauthorized alteration of a backup file using data samples according to one or more embodiments of the disclosure. Process 500 may use processing logic, which may include software, hardware, or a combination thereof. For example, process 500 may be performed by a system including one or more components described in operating environment 100.

In 501, the system (e.g. validation manager 175) may identify a creation of a backup file (e.g. backup file 220) that is stored within a backup storage environment (e.g. backup storage environment 160). For example, the backup file may be created by a backup application (e.g. backup application 152) as part of backup process for a source system (e.g. source system 110). In some embodiments, a fingerprint (e.g. fingerprint 230) of the backup file may be generated in response to the creation of the backup file. For example, the system may be capable of using the fingerprint to identify and validate (or verify, confirm, etc.) the contents of the backup file. Accordingly, in some embodiments, the backup storage environment may store a fingerprint that is generated in response to the creation of the corresponding backup file. In some embodiments, the fingerprint may be a hash value.

In 502, the system may determine a set of locations within the backup file from which to obtain the one or more sample bytes (or portions of data). For example, the location may specify a portion of a file using any suitable information such as an address, offset, or any other information specifying data locations. In some embodiments, the set of locations may be selected (or determined) at random. In addition, in some embodiments, the set of locations may be specific to the particular backup file. For example, to provide a further layer of security, the set of locations used for a first backup file may be different than the set of location used for a second backup file.

In 503, the system may request an initial sampling of bytes from the backup file stored within the backup storage environment. In some embodiments, the request may include a set of locations within the backup file from which to obtain one or more sample bytes. In some embodiments, the system may request the initial sampling of bytes in response to identifying the creation of the backup file.

In response to the request for the initial sampling, the system may receive the initial sampling of bytes from the backup storage environment. In some embodiments, the system may receive the sampling of bytes from the backup storage environment via a backup application (e.g. backup application 152), or directly from the backup storage environment. In either scenario, the system may interact (directly or indirectly) with an OS (e.g. OS 210) of the backup storage environment to request/receive the sampling of bytes.

In 504, the system may store the initial sampling of bytes (e.g. sampling 410) in a validation database (e.g. validation database 177) that is separate from the backup storage environment. In some embodiments, the system may store the initial sampling of bytes in a validation database in response to receiving the initial sampling of bytes from the backup storage environment. In some embodiments, for each backup file, the validation database may store an identifier (e.g. filename), the associated set of locations within the particular backup file from which to obtain one or more sample bytes, the associated sampling of backup data (e.g. sampling 410), and the associated copy of the fingerprint (e.g. copy of the fingerprint 280).

In 505, the system may request a subsequent sampling of bytes from the backup file stored within the backup storage environment. In some embodiments, the system may request the subsequent sampling from the backup storage environment periodically. For example, the system may request the subsequent sampling at predefined intervals (e.g. hourly) as part of a security policy. In some embodiments, the periodic request (e.g. each periodic request) may include the locations within the backup file from which to obtain the one or more sample bytes. In some embodiments, the particular backup file may be selected as a candidate for a subsequent sampling based on certain attributes. For example, the system may select particular backup files based on a determination the backup files may store critical data such as system files. Accordingly, such backup files may be prioritized for verification as the malicious code may target such files first. In addition, the particular backup file may be selected as a candidate for a subsequent sampling based on a randomized selection of backup files.

In response to the request for a subsequent sampling, the system may receive the subsequent sampling of bytes from the backup storage environment. As described, in some embodiments, the system may receive the sampling of bytes from the backup storage environment via the backup application. For example, the system may use the backup application as an intermediary to provide an additional security layer in the event the backup storage environment is compromised. However, in some embodiments, the system may receive the sampling of bytes directly from the backup storage environment. In either scenario, the system may interact (directly or indirectly) with an OS (e.g. OS 210/260) of the backup storage environment to request/receive the sampling of bytes.

In 506, the system may determine whether the subsequent sampling of bytes received from backup storage environment matches the initial sampling of bytes stored in the validation database. In some embodiments, the system may perform such a determination in response to receiving the subsequent sampling of bytes from the backup storage environment.

In 507, the system may alert the backup storage environment that the backup file has been subjected to an unauthorized alteration (or modification, update, etc.) based on the subsequent sampling. In some embodiments, the system may issue the alert in response to determining the subsequent sampling of bytes received from backup storage environment does not match the initial sampling of bytes stored in the validation database. As described, the unauthorized alteration may be an unauthorized encryption. For example, the encryption may be performed using any suitable encryption technique by malicious code as part of a ransomware attack on the backup storage environment.

As described, the alert may be issued depending on the results of a validation. For example, the validation may be based on the sampling of bytes. However, the system may also be capable of validating fingerprints. For example, the system may store a copy of the fingerprint of the backup file in the validation database. In some embodiments, the system may store the copy of the fingerprint in response to identifying the creation of the backup file. Accordingly, the system is capable of requesting a current fingerprint of the backup file stored within the backup storage environment as part of the validation process. For example, the system may request the current fingerprint as part of the security policy. The system may then determine whether the current fingerprint stored within the backup storage environment matches the copy of the fingerprint stored within the validation database.

However, as described, the backup storage environment may be compromised by malicious code. For example, the unauthorized alteration may be performed by malicious code executed within the backup storage environment. Accordingly, the backup file may be subjected to the unauthorized alteration without detection by the backup storage environment. Moreover, in some embodiments, the fingerprint of the backup file stored within the backup storage environment may remain unchanged after the unauthorized alteration. For example, the malicious code may be configured to cause the backup storage environment (e.g. via the backup application or OS) to provide the unchanged fingerprint in response to a request for a current fingerprint of the backup file. However, to counteract such a scenario, the system may rely on the above-described sampling of data, instead of solely relying on a fingerprint comparison. Accordingly, in some embodiments, the system may alert the backup storage environment that the backup file has been subjected to the unauthorized alteration despite the current fingerprint stored within the backup storage environment matching the copy of the fingerprint stored within the validation database. For example, the alert may be issued even when the system determines the current fingerprint stored within the backup storage environment matches the copy of the fingerprint stored within the validation database.

The alert may include various actions including notifying the backup storage environment of the potential security threat. In addition, as part of the alert, the system may initiate security measures such as preventing further accesses (e.g. writes) to the backup storage environment, or disconnecting network access to the backup storage environment. In some embodiments, the alert may also include including notifying a production system (e.g. source system 110) of the potential security threat. In some embodiments, the system may also perform additional validations, for example, of data within a secondary (e.g. disaster recovery) storage environment. For example, the backup files (e.g. backup file 220) may be replicated to the secondary storage environment as a recovery instance, and the system may validate the integrity of the recovery instance of the backup file (e.g. verify the recovery instance is not also encrypted). Moreover, the system may initiate recovery (or restoration) of the original backup file from the recovery instance.

Accordingly, in some embodiments, the method provides for the efficient detection of ransomware attacks within a backup storage environment FIG. 6 shows a block diagram of an example of a computing system that may be used in conjunction with one or more embodiments of the disclosure. For example, computing system 600 (or system, or server, or computing device, or device) may represent any of the devices or systems (e.g. validation manager 175, backup storage environment 160, etc.) described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor(s) 610 may retrieve stored instructions from one or more of the memories 620, 625, and 630 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 610 may perform operations in an on-demand or "cloud computing" environment or as a service (e.g. within a "software as a service" (SaaS) implementation). Accordingly, the performance of operations may be distributed among the one or more processors 610, whether residing only within a single machine or deployed across a number of machines. For example, the one or more processors 610 may be located in a single geographic location (e.g. within a home environment, an office environment, or a server farm), or may be distributed across a number of geographic locations. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g. accessible via a network).

A display controller 650 may be coupled to the bus 605 in order to receive display data to be displayed on a display device 655, which can display any one of the user interface features or embodiments described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 may represent any of the instructions, applications, software, libraries, toolkits, modules, components, engines, units, functions, logic, etc. as described herein (e.g. validation manager 175). Program code 670 may reside, completely or at least partially, within the memories described herein (e.g. non-transitory computer-readable media), or within a processor during execution thereof by the computing system. Program code 670 may include both machine code, such as produced by a compiler, and files containing higher-level or intermediate code that may be executed by a computing system or other data processing apparatus (or machine) using an interpreter. In addition, program code 670 can be implemented as software, firmware, or functional circuitry within the computing system, or as combinations thereof. Program code 670 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   identify a creation of a backup file that is stored within a backup storage environment, the backup storage environment further storing a fingerprint of the backup file that is generated in response to the creation of the backup file;
   request an initial sampling of bytes from the backup file, the request including a set of locations within the backup file from which to obtain one or more sample bytes;
   store, in response to receiving the initial sampling of bytes from the backup storage environment, the initial sampling of bytes in a validation database that is separate from the backup storage environment;
   request, periodically, a subsequent sampling of bytes from the backup file, the periodic request including the locations within the backup file from which to obtain the one or more sample bytes;
   determine, in response to receiving the subsequent sampling of bytes from the backup storage environment, whether the subsequent sampling of bytes received from the backup storage environment matches the initial sampling of bytes stored in the validation database; and
   alert the backup storage environment that the backup file has been subjected to an unauthorized alteration, in response to determining the subsequent sampling of bytes received from backup storage environment does not match the initial sampling of bytes stored in the validation database.

2. The system of claim 1, wherein the backup file is subjected to the unauthorized alteration without detection by the backup storage environment, and the fingerprint of the backup file stored within the backup storage environment remains unchanged after the unauthorized alteration.

3. The system of claim 2, wherein the unauthorized alteration is performed by malicious code executed within the backup storage environment.

4. The system of claim 3, wherein the malicious code is configured to cause the backup storage environment to provide the unchanged fingerprint in response to a request for a current fingerprint of the backup file.

5. The system of claim 1, wherein the plurality of instructions, when executed, further cause the one or more processors to:
   store, in response to identifying the creation of the backup file, a copy of the fingerprint of the backup file in the validation database;
   request, as part of a security policy, a current fingerprint of the backup file stored within the backup storage environment; and
   determine whether the current fingerprint stored within the backup storage environment matches the copy of the fingerprint stored within the validation database.

6. The system of claim 5, wherein alerting the backup storage environment includes alerting the backup storage environment that the backup file has been subjected to the unauthorized alteration despite determining the current fingerprint stored within the backup storage environment matches the copy of the fingerprint stored within the validation database.

7. The system of claim 1, wherein the plurality of instructions, when executed, further cause the one or more processors to:
   determine the set of locations within the backup file from which to obtain the one or more sample bytes based on a random selection of locations specific to the backup file.

8. The system of claim 1, wherein the unauthorized alteration comprises an unauthorized encryption.

9. A method of detecting a ransomware threat, comprising:
   identifying, by a validation manager, a creation of a backup file that is stored within a backup storage environment, the backup storage environment further storing a fingerprint of the backup file that is generated in response to the creation of the backup file;
   requesting an initial sampling of bytes from the backup file, the request including a set of locations within the backup file from which to obtain one or more sample bytes;
   storing, in response to receiving the initial sampling of bytes from the backup storage environment, the initial sampling of bytes in a validation database that is separate from the backup storage environment;
   requesting, periodically, a subsequent sampling of bytes from the backup file, the periodic request including the locations within the backup file from which to obtain the one or more sample bytes;
   determining, in response to receiving the subsequent sampling of bytes from the backup storage environment, whether the subsequent sampling of bytes received from backup storage environment matches the initial sampling of bytes stored in the validation database; and
   alerting the backup storage environment that the backup file has been subjected to an unauthorized alteration, in response to determining the subsequent sampling of bytes received from the backup storage environment does not match the initial sampling of bytes stored in the validation database.

10. The method of claim 9, wherein the backup file is subjected to the unauthorized alteration without detection by the backup storage environment, and the fingerprint of the backup file stored within the backup storage environment remains unchanged after the unauthorized alteration.

11. The method of claim 10, wherein the unauthorized alteration is performed by malicious code executed within the backup storage environment, and the malicious code is configured to cause the backup storage environment to provide the unchanged fingerprint in response to a request for a current fingerprint of the backup file.

12. The method of claim 9, further comprising:
storing, in response to identifying the creation of the backup file, a copy of the fingerprint of the backup file in the validation database;
requesting, as part of a security policy, a current fingerprint of the backup file stored within the backup storage environment; and
determining whether the current fingerprint stored within the backup storage environment matches the copy of the fingerprint stored within the validation database.

13. The method of claim 12, wherein alerting the backup storage environment includes alerting the backup storage environment that the backup file has been subjected to the unauthorized alteration despite determining the current fingerprint stored within the backup storage environment matches the copy of the fingerprint stored within the validation database.

14. The method of claim 9, further comprising:
determining the set of locations within the backup file from which to obtain the one or more sample bytes based on a random selection of locations specific to the backup file.

15. A computer program product comprising a non-transitory computer-readable medium having a computer-readable program code embodied therein to be executed by one or more processors, the program code including instructions to:
identify a creation of a backup file that is stored within a backup storage environment, the backup storage environment further storing a fingerprint of the backup file that is generated in response to the creation of the backup file;
request an initial sampling of bytes from the backup file, the request including a set of locations within the backup file from which to obtain one or more sample bytes;
store, in response to receiving the initial sampling of bytes from the backup storage environment, the initial sampling of bytes in a validation database that is separate from the backup storage environment;
request, periodically, a subsequent sampling of bytes from the backup file, the periodic request including the locations within the backup file from which to obtain the one or more sample bytes;
determine, in response to receiving the subsequent sampling of bytes from the backup storage environment, whether the subsequent sampling of bytes received from the backup storage environment matches the initial sampling of bytes stored in the validation database; and
alert the backup storage environment that the backup file has been subjected to an unauthorized alteration, in response to determining the subsequent sampling of bytes received from backup storage environment does not match the initial sampling of bytes stored in the validation database.

16. The computer program product of claim 15, wherein the backup file is subjected to the unauthorized alteration without detection by the backup storage environment, and the fingerprint of the backup file stored within the backup storage environment remains unchanged after the unauthorized alteration.

17. The computer program product of claim 16, wherein the unauthorized alteration is performed by malicious code executed within the backup storage environment, and the malicious code is configured to cause the backup storage environment to provide the unchanged fingerprint in response to a request for a current fingerprint of the backup file.

18. The computer program product of claim 15, wherein the program code includes further instructions to:
store, in response to identifying the creation of the backup file, a copy of the fingerprint of the backup file in the validation database;
request, as part of a security policy, a current fingerprint of the backup file stored within the backup storage environment; and
determine whether the current fingerprint stored within the backup storage environment matches the copy of the fingerprint stored within the validation database.

19. The computer program product of claim 18, wherein alerting the backup storage environment includes alerting the backup storage environment that the backup file has been subjected to the unauthorized alteration despite determining the current fingerprint stored within the backup storage environment matches the copy of the fingerprint stored within the validation database.

20. The computer program product of claim 15, wherein the program code includes further instructions to:
determine the set of locations within the backup file from which to obtain the one or more sample bytes based on a random selection of locations specific to the backup file.

* * * * *